March 7, 1967 D. C. BOYSEN 3,308,422

BRIDGING CONNECTOR FOR TELEPHONE TERMINAL BLOCKS

Filed Aug. 19, 1965

Donald C. Boysen
INVENTOR.

BY Clarence A. O'Brien
and Harvey B. Jacobson
Attorneys

United States Patent Office 3,308,422

Patented Mar. 7, 1967

3,308,422

BRIDGING CONNECTOR FOR TELEPHONE TERMINAL BLOCKS

Donald C. Boysen, Hills, Minn. 56138

Filed Aug. 19, 1965, Ser. No. 480,976
6 Claims. (Cl. 339—198)

This invention relates to a novel and useful connecting block for electrical terminals and more specifically to a means of quickly and easily connecting together two or more sets of terminals on a standard telephone terminal block when the terminals to be connected together are located to the right or left of each other, there being means presently available for connecting such terminals if the terminals to be connected are located in a front to rear relation relative to each other within the same row of terminals.

The aforementioned standard telephone terminal blocks include elongated electric terminals supported from and projecting upwardly from the block and arranged in spaced side-by-side rows of terminals with the terminals of each row spaced front to rear relative to each other.

Since the most common use of this invention at the present time would be in the intercepting of unused or disconnected telephone numbers, it may be termed an intercept connector. However, it could be used for many purposes which require the making of connections of the aforementioned type on a standard telephone terminal block.

Since the terminals to be connected together would be located at different positions relative to each other at different times, the connection to be accomplished must be as readily made if the sets of terminals to be connected are located at the extreme ends of the terminal block as when located immediately adjacent each other. These connections must also be able to electrically connect any number of sets of terminals together from two sets up to and including all of the sets of terminals that are located in a right to left relation relative to each other in a given row (or rows) on a terminal block.

It is accordingly the main object of this invention to provide a connecting block for electrical terminals of a conventional or standar dtelephone terminal block and operative to electrically connect transversely aligned terminals of the telephone terminal block spaced apart in separate side-by-side rows of terminals extending from front to rear relative to the telephone terminal block.

Yet another object of this invention is to provide a connecting block in accordance with the immediately preceding object and which may be utilized in sets of a plurality of connecting blocks for electrically connecting any number of transversely aligned terminals disposed in preselected side-by-side rows of terminals.

Still another object of this invention is to provide a connecting block in accordance with the preceding objects and constructed in a manner whereby it may be readily shifted along the row of electrical terminals with which it is operatively engaged.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
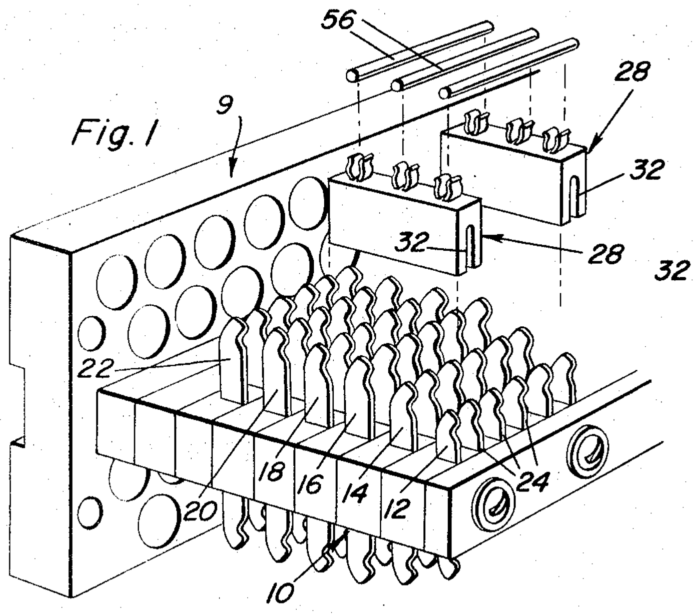
FIGURE 1 is a fragmentary perspective view of a conventional form of telephone terminal block with a pair of the connecting blocks of the instant invention illustrated in exploded position relative thereto.
Figure 2:
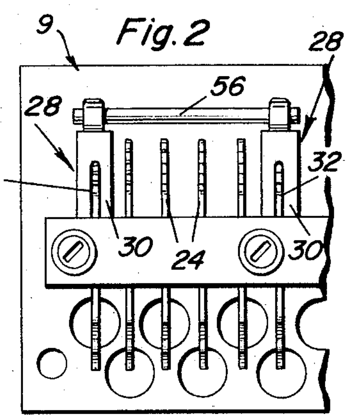
FIGURE 2 is a fragmentary front elevational view of the terminal block shown with a pair of the connecting blocks being utilized to electrically bridge terminals in separate rows of terminals on the terminal block.
Figures 3, 4, 5, 6:
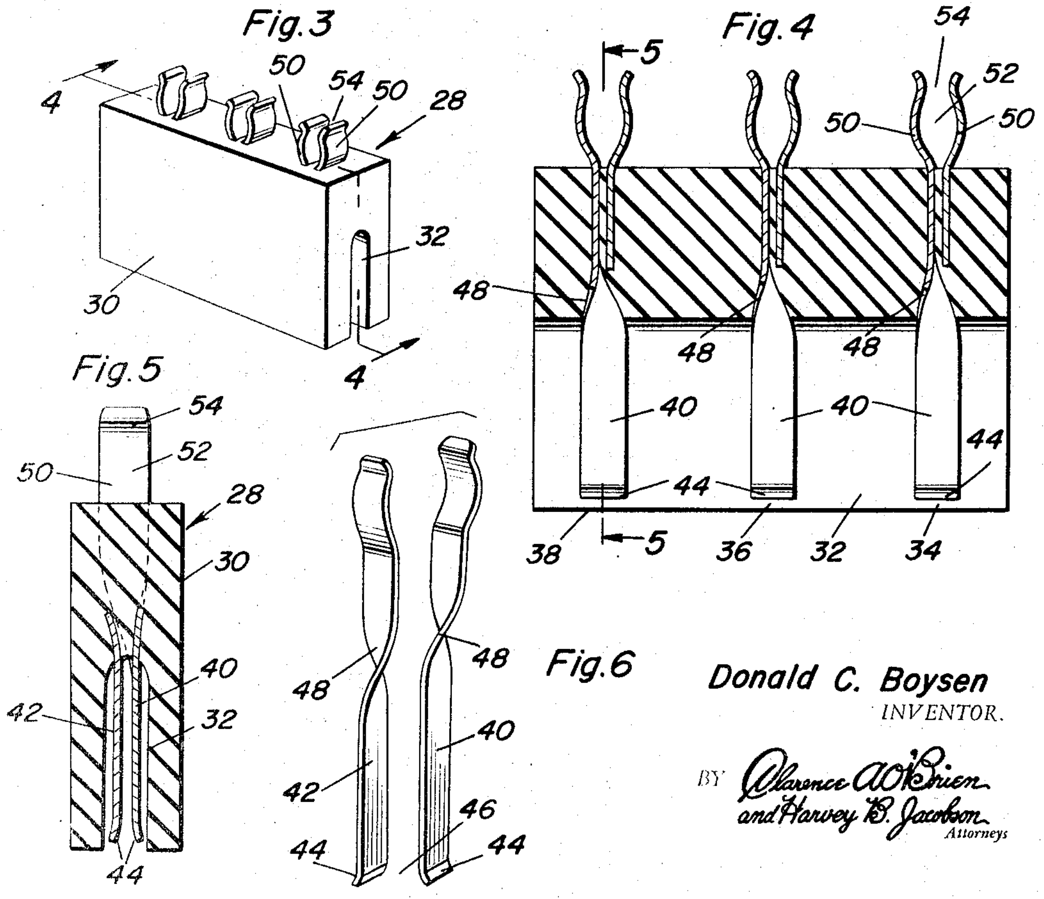
FIGURE 3 is a perspective view of one of the connecting blocks of the instant invention.
FIGURE 4 is an enlarged vertical sectional view taken substantially upon the plane indicated by the section line 4—4 of FIGURE 3.
FIGURE 5 is a vertical sectional view taken substantially upon the plane indicated by the section line 5—5 of FIGURE 4.
FIGURE 6 is a perspective view of a pair of the contact members or arms of the terminal block.

Referring now more specifically to the drawings, the numeral 9 generally designates a mounting board upon which a conventional form of telephone terminal block 10 is mounted. The terminal block 10 is provided with a plurality of elongated upstanding blade-like terminals 12, 14, 16, 18, 20 and 22 arranged in side-by-side rows 24 of terminals with corresponding terminals in each row of terminals being laterally aligned.

Existing means are presently provided for electrically connecting preselected terminals in each row of terminals of the terminal block 10 but heretofore means has not been provided for electrically connecting corresponding terminals of different rows of terminals of the terminal block 10.

The connecting block of the instant invention is generally referred to by the reference numeral 28 and is provided and utilized in pairs for electrically connecting corresponding terminals in different rows of terminals on the terminal block 10. The connecting block 28 includes a body portion 30 constructed of dielectric material and the body portion includes downwardly opening and longitudinally extending recess means 32 in the form of a continuous downwardly opening slot which also opens outwardly of the opposite ends of the body 30 and which is composed of individual recess sections 34, 36 and 38 forming continuations of each other. Each body portion 30 includes one or more pairs of contact means in the form of panel-like contact arms 40 and 42. Each pair of arms 40 and 42 are disposed in generally parallel relation and include lower end portions disposed within the recess or slot 32 which terminate downwardly in laterally directed terminal end portions 44 defining a flared throat 46 between the lower ends of each pair of contact arms 40 and 42. In addition, the upper end portions of the contact arms 40 and 42 are twisted 90 degrees about their longitudinal axes as at 48 and extend upwardly through the portion of the body portion 30 disposed above the recess or slot 32. The upper end portions of the contact arms 40 and 42 then terminate in upper terminal end portions 50 projecting above the body portion 30 and defining a bulbous pocket 52 therebetween which opens upwardly and is flared at its upper end as at 54.

One or more bridging rods or bars 56 may be provided as desired and it may be seen that each connecting block 28 may be engaged with one row of terminals with another connecting block 30 engaged with another row of terminals. Then, suitable bridging bars or rods 56 are utilized to electrically connect the upper terminal end portions of corresponding pairs of contact arms 40 and 42. It is, of course, to be understood that the connecting blocks 28 could be spaced as far apart as desired in order to electrically connect corresponding terminals in different rows of terminals of the terminal block 10 and that the bridging bars or rods 56 may be of any suitable length so as to be adapted to span the distance between each pair of connecting blocks 28.

The foregoing is considered as illustrative only of the principles of the invention. Further, since numerous modifications and changes will readily occur to those skilled in the art, it is not desired to limit the invention to the exact construction and operation shown and described and accordingly all suitable modifications and equivalents may be resorted to, falling within the scope of the invention as claimed.

What is claimed as new is as follows:

1. In combination with a terminal block of the type including a plurality of electrical terminal means supported and projecting upwardly from said block and arranged in spaced side-by-side rows of terminal means with the terminal means of each row spaced front to rear relative to each other, a pair of connecting blocks each comprising an upstanding panel-like body of dielectric material and defining an upstanding center plane, said panel-like bodies including means defining downwardly opening recess means removably telescoped downwardly over at least one pair of elongated terminal means disposed in different rows of terminal means, said connecting blocks including contact means having lower end portions disposed in and on opposite sides of said recess means and frictionally gripping and defining an electrical connection with the corresponding terminal means, said contact means also including integral upper portions projecting upwardly through the upper portions of said bodies and including upper terminal ends defining upper contact means, and a bridging element removably bridging and electrically connected with said upper contact means of said blocks thereby electrically connecting the terminal means of said different rows of terminal means with which said contact means are engaged.

2. The combination of claim 1 wherein said contact means comprises a pair of flat blade-like and generally parallel contact arms spaced apart relative to each other, the portions of said and upper end portions extending through said body being twisted approximately ninety degrees about their longitudinal axes and being embedded in said body, said upper terminal ends being of configurations defining a bulbous pocket therebetween opening upwardly and flared at its upper ends to receive said bridging element therein.

3. The combination of claim 2 wherein said flat blade-like contact arms are constructed of resilient material.

4. The combination of claim 1 wherein said recess means defines a pair of recess sections each opening downwardly and provided with said contact means.

5. The combination of claim 1 wherein said contact means comprises a pair of flat blade-like and generally parallel contact arms spaced apart relative to each other, the portions of said and upper end portions extending through said body being twisted approximately ninety degrees about their longitudinal axes and being embedded in said body, said upper terminal ends being of configurations defining a bulbous pocket therebetween opening upwardly and flared at its upper ends to receive said bridging element therein, said recess means defining a pair of recess sections, each opening downwardly and provided with said contact means, the arms of each pair of arms being disposed on opposite sides of a plane generally paralleling said center plane and extending between said pair of recess sections.

6. The combination of claim 5 wherein said recess sections comprise portions of a single downwardly opening recess formed in said body and generally paralleling said center plane.

References Cited by the Examiner

UNITED STATES PATENTS

| | | | |
|---|---|---|---|
| 1,122,575 | 12/1914 | Cook et al. | 200—115 |
| 2,131,584 | 9/1938 | Cruser | 317—112 |
| 2,701,346 | 2/1955 | Powell | 339—17 |
| 2,849,700 | 8/1958 | Perkin | 339—198 |
| 2,858,372 | 10/1958 | Kaufman | 179—91 |
| 3,173,733 | 3/1965 | Weimer et al. | 339—258 X |

EDWARD C. ALLEN, *Primary Examiner.*

ALFRED S. TRASK, *Examiner.*